United States Patent [19]

Diaz

[11] Patent Number: 4,561,471
[45] Date of Patent: Dec. 31, 1985

[54] WASHING MACHINE RINSE-WATER DIVERTER VALVE

[76] Inventor: Frank V. Diaz, 207 Galiuro St., Mammoth, Ariz. 85618

[21] Appl. No.: 613,522

[22] Filed: May 24, 1984

[51] Int. Cl.$^4$ .................. F16K 11/06; F16K 31/02
[52] U.S. Cl. .................. 137/870; 137/625.48; 137/315; 251/129.15
[58] Field of Search .............. 137/374, 561 R, 625.48, 137/870, 874, 315; 251/129

[56] References Cited

U.S. PATENT DOCUMENTS

| | | | |
|---|---|---|---|
| 2,414,196 | 1/1947 | Geldhof et al. | 137/870 X |
| 3,027,908 | 4/1962 | Cochran | 137/870 X |
| 3,248,909 | 5/1966 | Knerr | 68/12 |
| 3,306,321 | 2/1967 | Bastle | 137/625.48 |
| 3,307,825 | 3/1967 | Sollenbarger | 251/138 |
| 3,310,063 | 3/1967 | Edwards | 137/216 |
| 3,318,122 | 5/1967 | Starr et al. | 68/210 |
| 3,321,172 | 5/1967 | Buss | 251/7 |
| 3,482,816 | 12/1969 | Arnold | 251/129 X |
| 3,566,631 | 3/1971 | Willis | 68/208 |
| 3,771,561 | 11/1973 | Santamaria, Jr. | 137/625.48 X |
| 4,074,700 | 2/1978 | Engle | 251/129 X |
| 4,425,935 | 1/1984 | Gonzalez | 137/315 |

FOREIGN PATENT DOCUMENTS 975869 10/1950 France .................. 137/883

Primary Examiner—A. Michael Chambers
Assistant Examiner—John C. Fox
Attorney, Agent, or Firm—Victor Flores

[57] ABSTRACT

A dump valve adapted for use with automatic clothes washing machines provides an optional water conservation feature which allows the user to divert draining rinse water from the normal sewer drain port to an alternate drain port. The optional water conservation feature consists of an electrical control circuit connected to the rinse cycle of a washing machine timer switch which can energize a solenoid coil and in turn will operate the diverter dump valve. A diverter gate is contained within a housing which has an inlet portion and an outlet portion having a normal drain port and an alternate drain port. The diverter gate contained within the dump valve housing is a solid, rectangular, plate-like, structure having a suitably located cylindrical opening for normal drain operation of the dump valve, a solid, blocking surface which inhibits the flow of water to an alternate drain port when not actuated or which will inhibit the flow of water to the normal drain port when actuated. The diverter gate is adapted to have a stem portion releaseably connected to the solenoid core.

4 Claims, 6 Drawing Figures

WASHING MACHINE RINSE-WATER DIVERTER VALVE

BACKGROUND OF THE INVENTION

1. Field of the Invention

The present invention generally relates to dump valves used in automatic washing machines and more particularly, is concerned with a novel dump valve which allows the user to select where the rinse water will be disposed by being able to divert the draining rinse water from the normal sewer drain port to an alternate drain port for reuse elsewhere and thus conserve a precious natural resource, namely water.

2. Description of the Prior Art

In arid areas water is a precious natural resource and today's automatic clothes washing machines with the presently available drain systems do not offer any water conservation feature which allows a secondary use of the clean rinse water. Presently, automatic clothes washing machines are provided with drain systems that are activated by control circuitry and generally involve a pump of the impeller type drawing wash or rinse water from a sump and forcing the wash or rinse water to an appropriate sewer drain or septic tank connection. These type of drain systems do not lend themselves to conveniently divert the use of the drain water, especially the clean rinse water, unless possibly some cumbersome manual coordinated method is employed. The result is that the rinse water is not utilized and other water is used in its place to further deplete the water supply. Dump valves available do not offer the water conservationalist a solution for tapping into this readily available water source to prevent further depletion of the water supply.

Consequently, a need exists for a device which can be an integral part of a washing machine drain system and which can be activated at will during the rinse cycle portion of the wash cycle and divert the rinse water from a sewer drain to an alternate drain and serve a useful purpose and thus conserve on water.

SUMMARY OF THE INVENTION

The principal object of the invention is directed at providing the consumer with a feature on washing machines which will conserve on water by directing the rinse water from the sewer or the like to another use which would otherwise require other water to maintain and thus overcomes a deficiency existing in modern automatic clothes washing machines. The present invention overcomes the deficiency and provides a solution for the water conservationalist in that the rinse water can be utilize by merely selecting a feature switch which will divert the draining rinse water from a normal drain to an alternate drain port.

Another object of the invention is to provide the means with which to connect the dump valve controls to the rinse portion of the washing machine timer switch such that the diverter dump valve will function only during the rinse cycle and only when the user wants to utilize the rinse water for another purpose.

Another object of the invention is to provide a dump valve which when installed on a washing machine drainage system will not impede the normal operation of a machine if the feature switch is not selected.

Accordingly, the present invention relates to a novel type of diverter valve used in automatic clothes washing machines and which provides a consumer with the option of being able to utilize clean rinse water which is being disposed down the sewer by merely selecting a feature switch which will activate the diverter valve during the rinse cycle. Therefore, to the accomplishment of the foregoing objects, the invention consists of the features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 1a shows a backside view of a washing machine with dump valve installed.

DETAILED DESCRIPTION OF THE PREFERRED EMBODIMENT

Figure 1:
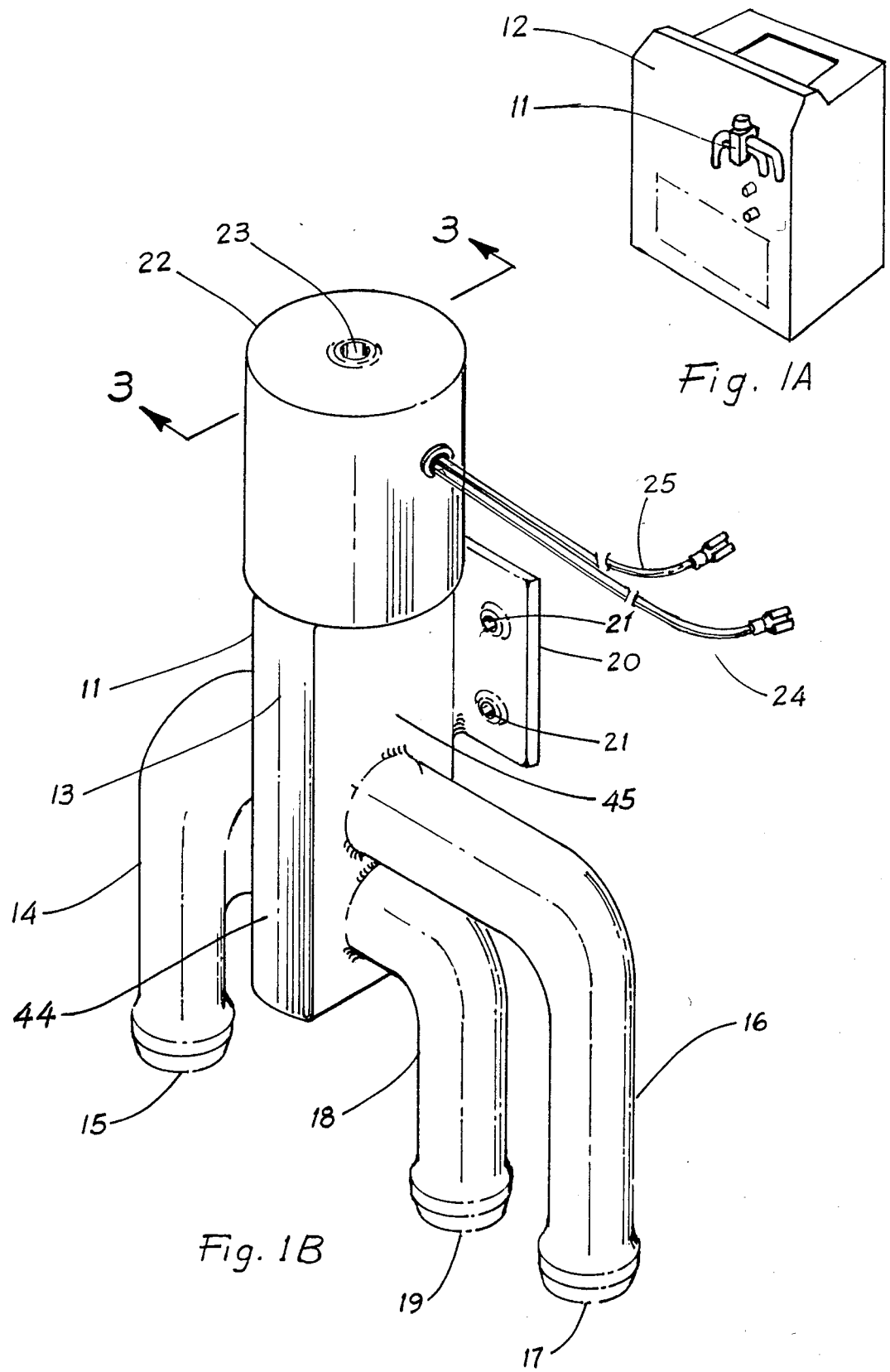
FIG. 1 is a perspective view of the novel dump valve.

Referring now to the drawings, and more particularly to FIG. 1, there is shown the dump valve 11 generally attached to the rear of a washing machine 12 as shown in FIG. 1a and in perspective therealso is shown the preferred embodiment of the invention. The dump valve is comprised of a diverter gate housing 13 adapted to have an inlet portion housing 44, an outlet portion housing 45, a mounting bracket 20, and a solenoid 22. Inlet portion housing 44 having an inlet port 14 with end 15 adapted for connecting a hose coming from the washing machine drain pump (not shown). Similarly the outlet portion housing 45 has a normal drain port 16 with end 17 and alternate drain port 18 with end 19. The normal drain outlet end 17 and alternate drain outlet end 19 are each adapted for connecting a hose (not shown) for directing the drain water to either a sewer drain or an alternate use which is consumer's option (also not shown). The mounting bracket 20 is shown projecting sidewardly to the left and to the right from the upper lateral edges of the backside of the diverter gate housing 13 (see FIG. 5). The mounting bracket is adapted with mounting screw holes 21 for conveniently attaching to the backside of washing machine 12. Solenoid 22 is shown attached to the top side of the diverter housing 13 and having a first connecting coil connecting lead 24 and second external coil connecting lead 25 exiting therefrom adapted for connecting as shown in the electrical control circuit in FIG. 4.

Figure 2:
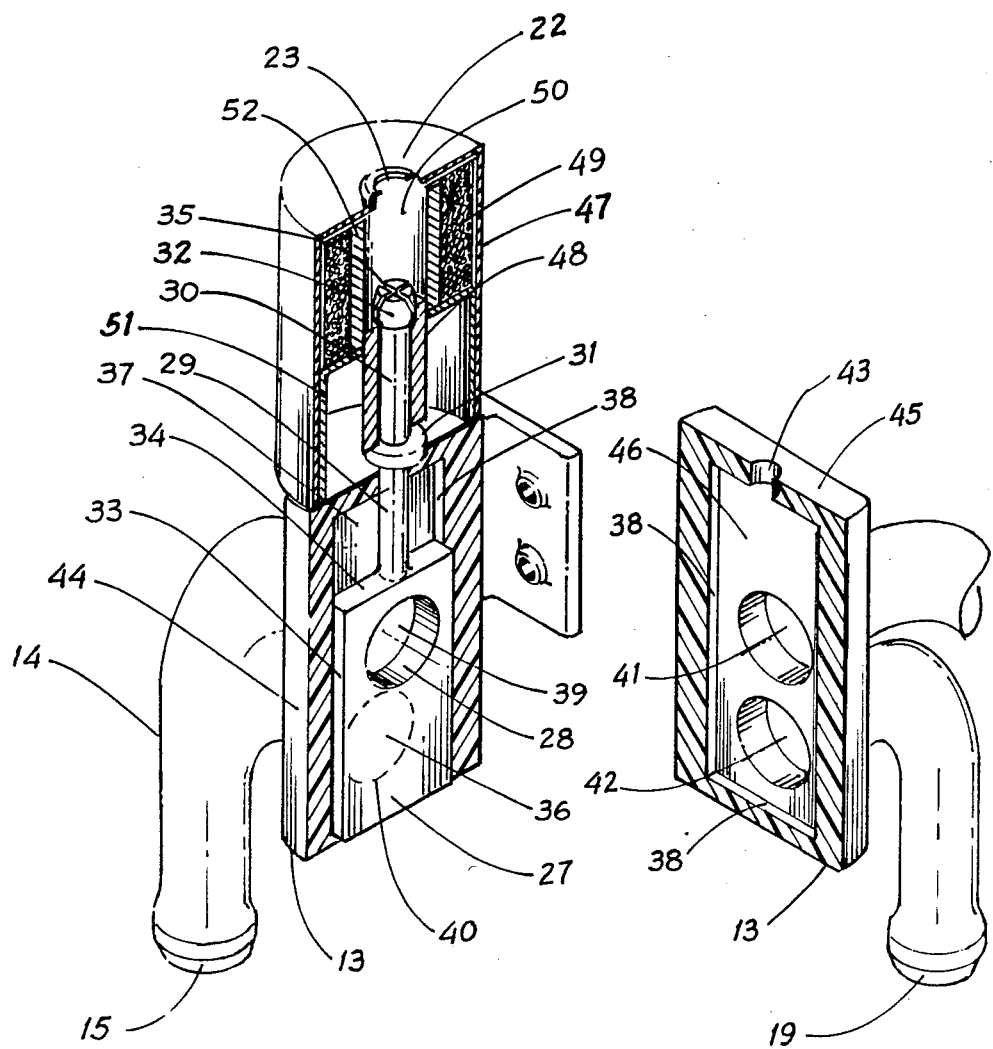
FIG. 2 is a midpoint cross-sectional view taken through 3—3 of FIG. 1 showing the diverter gate in the normal drain position, the attached solenoid and the inlet openings of the outlet portion.

The dump valve is shown in a cross-sectional view in FIG. 2 and shows in more detail the working novel parts of the invention. To accomplish the principal object of diverting rinse water from the normal drain to an alternate drain, diverter gate 27 is adapted to fit in a chamber defined by the junction of the inlet portion recessed wall area 37 and outlet portion recessed wall area 46, therebetween, the diverter gate 27 can slideably be actuated along the smooth chamber wall 38 by top mounted solenoid 22 from the normal drain open position (see FIG. 2) to the alternate drain open position (see FIG. 3).

As can be seen from FIG. 2 the diverter gate 27 is a rectangular solid having a cylindrical opening 28 located on the upper half of the diverter gate, a blocking surface 36 located on the lower half of the diverter gate and a gate stem portion comprised of a lower stem portion 29 and an upper stem portion 30 projecting upwardly from the midpoint of the top shoulder 34 of the rectangular solid.

Also shown in FIG. 2 within the inlet portion recessed wall area 37 are the inlet portion normal drain outlet opening 39 and inlet portion alternate drain outlet opening 40 and in the outlet portion recessed wall area 46 are the outlet portion normal drain inlet opening 41 and alternate drain inlet opening 42. At the upper end of each of the recessed areas 37 and 46 there is located a semi-circular gate stem opening 43 suitably sized to adequately encircle the lower stem portion 29 and allow traversal movement of diverter gate 27. Since the connection of dump valve 11 will not cause any water pressures at the point of installation, the junction of semi-circular gate stem openings 43 will not require a special seal.

Figure 3:
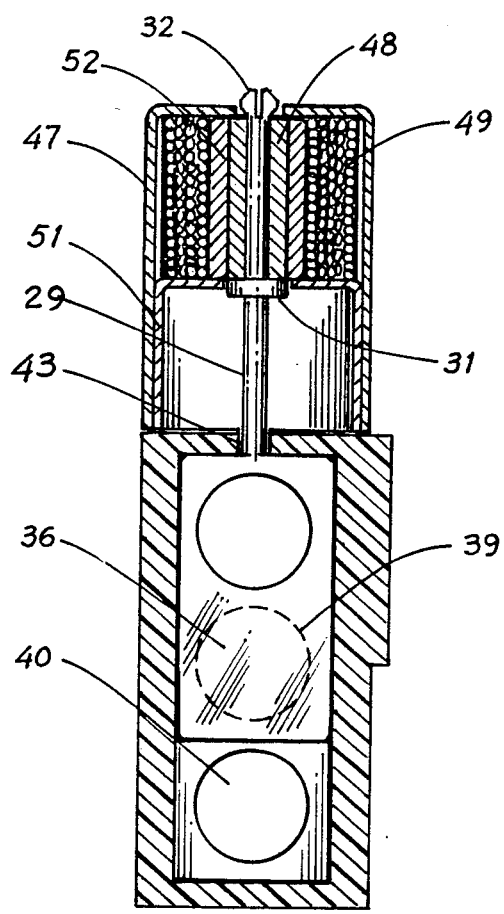
FIG. 3 is a partial frontal cutaway view showing the diverter gate in the alternate drain position.
Figure 5:
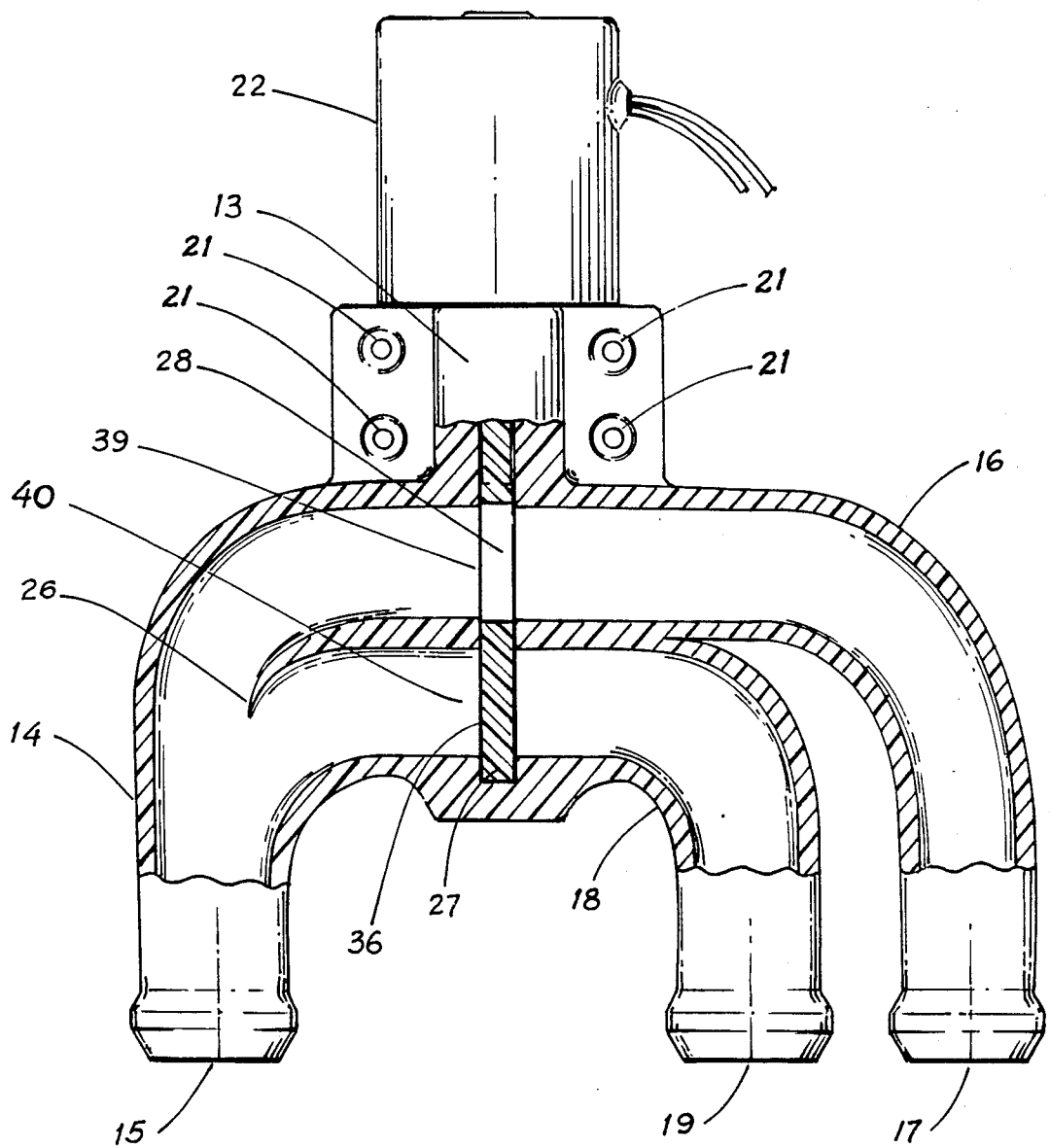
FIG. 5 is a partial frontal cutaway view showing fin in the inlet portion and the diverter gate in the normal drain position.

As can be seen in FIGS. 2, 3 and 5, the diverter gate is suitably sized such that the diverter gate blocking surface 36 will adequately block the low of water through openings 40 and 42 when not actuated or 39 and 41 when actuated. The cylindrical opening 28 has a diameter equal in size to the normal drain openings 39 and 41 and is suitably located on the gate such that the opening 28 is aligned to coincide with openings 39 an 41 when the diverter gate is in the normal drain position.

Also, the sizing of the stem portion of the diverter gate can best be understood by referring to FIGS. 2, 3 and 5. When the dump valve is actuated the rectangular portion of the diverter gate 27 must move upwardly such that the blocking surface 36 does not impede the flow of water between openings 40 and 42 and will impede the flow of water between openings 39 and 41. Therefore, the upper stem portion 29 is suitably sized to accommodate the distance required to open the alternate drain. As the lower stem portion 29 traverse opening 43, stem collar 31 also moves upwardly and stops at at the bottom of solenoid coil 49 (see FIG. 3). Upper stem portion 30 projecting from stem collar 31, including stem head 32, has a length equal to the height of lower stem 29 plus the additional distance required to be within the strength of the electric field of solenoid coil 49. This same distance must be used in the design of the solenoid stand-off base 51, solenoid actuator core 48, solenoid actuator chamber 50 and solenoid coil sleeve 52 described subsequently.

Referring to FIG. 5, the partial cutaway view shows the diverter gate 27 in the normal drain open position and more particularly shows a water diverting fin 26 located downstream of inlet port end 15. The fin 26 is optimumly constructed such that the diameters of outlet openings 39 and 40 are maintained equal to the diameter of inlet port 14. The primary purpose of fin 26 is to break the flow of water into the proper outlet opening.

As is best seen in FIG. 2, solenoid 22 is releasably attached to the upper surface of diverter gate housing 13. More particularly the solenoid is attached by inserting the stem head 32 having compression slots 35 into solenoid actuator core 48. Actuator core 48 is slideably forced along solenoid coil sleeve 52 into actuator chamber 50 whenever solenoid coil 49 is electrically energized. Since solenoid 22 is mounted on top of housing 13, actuator core 48 and diverter gate 27 will fall back within the diverter gate chamber to the normal drain open position whenever coil 49 is not energized. Solenoid principals are well known and need not be discussed here. The solenoid of the present invention is adapted with a standoff base 51 having a height equal to the distance traveled by lower stem 29 in opening the alternate drain. The solenoid is provided with cover 47 having an inspection hole 23 for viewing the operation of the diverter gate.

Figure 4:
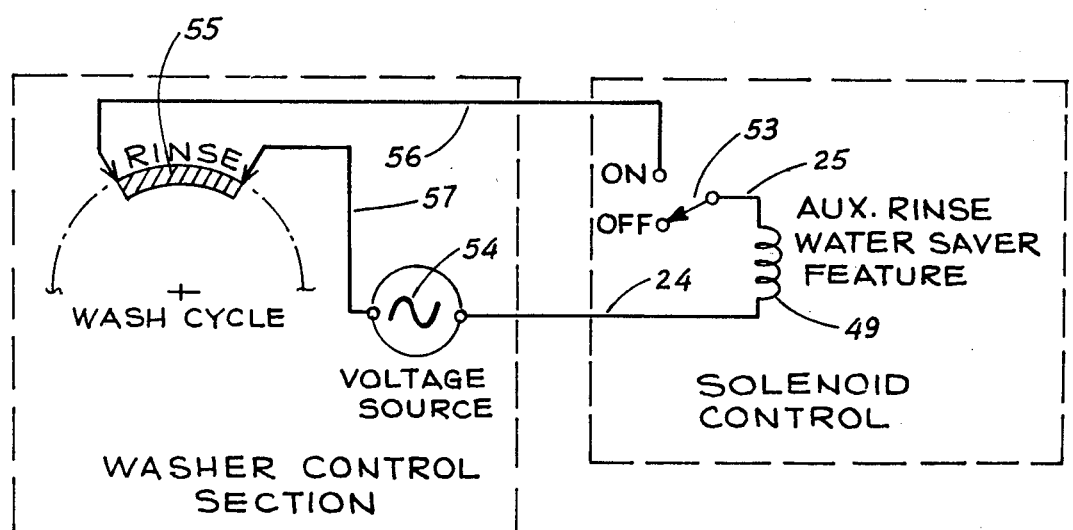
FIG. 4 is an electrical diagram showing the solenoid coil connected to a feature switch and the rinse cycle of a washing machine timer.

The control for the dump valve is shown in FIG. 4. Recalling that solenoid 22 was adapted to have a first and second lead 24 and 25 extend from coil 49. First external coil connecting lead 24 is shown connected to a first electrical connection of voltage source 54 of the washing machine control section. Second external coil connecting lead 25 is shown connected to feature switch 53. The on-side of switch 53 is connected to the rinse contacts (not shown) of the washing machine timer switch 55 through wire 56. Similarly the voltage source 54 having a second electrical connection is also connected to the rinse contacts (not shown) of timer switch 55 through wire 57. The intended operation is such that when the feature switch 53 is in off-position, the solenoid is not energized and the diverter valve is in the normal drain open position and that when the feature switch 53 is in the on-position the solenoid is energized and the diverter valve is in the alternate drain open position. The solenoid will remain energized only during the time which the rinse portion of the timer switch is connected to voltage source 54 or until the user turns the switch 53 off.

While the present invention has been shown and described herein in what is conceived to be the most practical and preferred embodiment, it is recognized that departures can be made therefrom within the scope of the invention, which is therefore not to be limited to the details disclosed herein but is to be accorded the full scope of the claims so as to embrace any and all equivalent devices.

I claim:

1. A dump valve for use with automatic clothes washing machines and having an optional feature which allows a user to divert draining rinse water from a normal drain port to an alternate drain port, said feature comprising:
    (a) a solid, rectangular, plate-like, diverter gate having a suitably located cylindrical opening for normal drain operation of the dump valve, a solid, blocking surface which inhibits flow of water to said alternate drain port when not actuated and will inhibit flow of water to said normal drain port when actuated, said gate also having parallel right and left sides with smooth surfaces, a top shoulder surface, a stem portion, said stem portion having a lower stem portion originating at midpoint of said top shoulder surface, a stem collar, an upper stem portion extending from said stem collar and terminating at a stem head having compression slots;
    (b) A diverter gate housing having an inlet portion, an outlet portion, a gate chamber and a mounting bracket;
    said inlet portion having an inlet port which divides downstream into a normal drain outlet opening and an alternate drain outlet opening, said inlet port normal drain outlet opening and alternate drain outlet opening being suitably sized to allow proper draining of said rinse water, said inlet portion also having a fin suitably located downstream of said inlet port, said fin having a curved portion which is constructed to curve downward toward said inlet port to provide a break in flow of said rinse water, said fin further being constructed to provide a wall separation for a suitable distance between said normal outlet opening and said alternate outlet opening toward said curved portion, said normal drain outlet opening and said alternate drain outlet opening originate at said curved fin portion and are sized within said wall portion to be equal to said inlet port;

said outlet portion having a complementary normal drain inlet opening and a complementary alternate drain inlet opening, said outlet portion normal drain inlet opening terminates downstream at said normal drain port and said outlet portion alternate drain inlet opening also terminates downstream at said alternate drain port, said inlet port, normal drain port and alternate drain port having ends suitably adapted for connecting a drain hose;

said gate chamber having an inlet portion recessed wall area and a symetrical outlet portion recessed wall area, said inlet portion and outlet portion recessed wall areas are located at their respective normal drain outlet and alternate drain outlet openings and normal drain inlet and alternate drain inlet openings, said recessed wall areas having a shape and size such that said diverter gate adequately fits within said chamber and is allowed to be actuated along defined parallel chamber side walls in an upward and downward fashion to effectuate opening and closing of said normal drain outlet and inlet openings and said alternate drain outlet and inlet openings enclosed within said gate chamber, said gate chamber having a gate stem opening which is not subjected to internal water pressure, said gate stem opening being suitably sized to allow vertical motion of said diverter gate;

said mounting bracket having mounting holes for suitable attachment to said automatic clothes washing machine, said mounting bracket being constructed as a continuous appendage of said diverter gate housing;

(c) A solenoid mounted above and coupled to said diverter gate housing and having a cover, an actuating core, a cylindrical core chamber, a standoff base and a coil, said actuating core having a hollow center suitably sized to accept said stem head compression slots and thereby allowing said upper stem portion to be inserted into said actuating core and thereby providing coupling to actuate said diverter gate, said actuating core having a length equivalent to said upper stem portion, said cylindrical core chamber having sleeving to provide a smooth surface for said actuating core, said coil having a first and second external coil connecting lead, said first external coil connecting lead attaching to a washer control section and said second external coil connecting lead attaching to an off-section of a feature selection switch, said standoff base having a vertical wall structure suitably constructed to contain said actuating core in a de-energized state when coupled to said diverter gate, said cover having an inspection hole for visual observation of said diverter gate; and (d) A control circuit coupled to said solenoid for selectively actuating said diverter gate, having an electrical source, a timer switch with a rinse cycle portion, and an on/off feature selection switch, said electrical source having a first and second electrical source connection, said first electrical source connection being connected to said first external coil connecting lead, said second electrical source connection being connected to said rinse cycle portion of said timer switch, said rinse cycle portion also having an electrical connection to an on-section of said on/off feature selection switch, said on/off feature switch having said second external coil connecting lead connected to said off-section of said on/off feature switch, said switch when in an off-state will not affect normal draining of said rinse water, said switch when in an on-state and during a selection of said rinse cycle portion will cause said solenoid to be energized and thereby opening said alternate drain outlet and inlet opening within said gate chamber and closing said normal drain outlet and inlet opening within said gate chamber.

2. A dump valve for use with automatic clothes washing machines and having an optional feature which allows a user to divert draining rinse water from a normal drain port to an alternate drain port, said feature comprising:

(a) means for diverting the draining of said rinse water from said normal drain port to said alternate drain port comprising a solid, rectangular, plate-like, diverter gate having a suitably located cylindrical opening for normal drain operation of the dump valve, a solid, blocking surface which inhibits flow of water to said alternate drain port when not actuated and which will inhibit flow of water to said normal drain port when actuated, parallel right and left sides with smooth surfaces, a top shoulder surface, a stem portion, said stem portion having a lower stem portion originating at midpoint of said top shoulder surface, a stem collar, an upper stem portion extending from said stem collar and terminating at a stem head having compression slots;

(b) means for housing said rinse water diverting means;

(c) said means for housing said rinse water diverting means including an inlet portion having an inlet port which divides downstream into a normal drain outlet opening and an alternate drain outlet opening, said inlet port, normal drain outlet opening and alternate drain outlet opening being suitably sized to allow proper draining of said rinse water, said inlet portion also having a fin suitably located downstream of said inlet port, said fin having a curved portion which is constructed to curve downward toward said inlet port to provide a break in flow of said rinse water, said fin further being constructed to provide a wall separation for a suitable distance between said normal outlet opening and said alternate outlet opening toward said curved portion, said normal drain outlet opening and said alternate drain outlet opening originate at said curved fin portion and are sized within said wall separation to be equal to said inlet port;

(d) said means for housing said rinse water diverting means also including an outlet portion having a complementary normal drain inlet opening and a complementary alternate drain inlet opening, said outlet portion normal drain inlet opening terminates downstream at said normal drain port and said outlet portion alternate inlet opening also terminates downstream at said alternate drain port, said inlet port, normal drain port and alternate drain port having ends suitably adapted for connecting a drain hose;

(e) said means for housing said rinse water diverting means further including a junction which forms a gate chamber, said chamber having an inlet portion recessed wall area and a symetrical outlet portion recessed wall area, said inlet portion and outlet portion recessed wall areas are located at their respective normal drain outlet and alternate drain outlet openings and normal drain inlet and alternate drain inlet openings, said recessed wall areas having a shape and size such that said rinse water diverting means adequately fits within said chamber and is allowed to be actuated along defined parallel chamber side walls in an upward and downward fashion to effectuate opening and closing of said normal drain outlet and inlet openings and said alternate drain outlet and inlet openings enclosed within said gate chamber, said gate chamber having a gate stem opening which is not subjected to internal water pressure, said gate stem opening being suitably sized to allow unimpeded upward and downward motion of said rinse water diverting means;

(f) said means for housing said rinse water diverting means also having a mounting bracket with mounting holes for suitable attachment to said automatic clothes washing machine, said mounting bracket further being constructed as a continuous appendage of said housing.

3. A dump valve for use with automatic clothes washing machines as recited in claim 2, further comprising:
a solenoid mounted above and coupled to said means for housing said diverter gate and having a cover, an actuating core, a cylindrical core chamber, a standoff base and a coil, said actuating core having a hollow center suitably sized to accept said stem head compression slots and thereby allowing said upper stem portion to be inserted into said actuating core and thereby providing coupling to actuate said diverter gate, said actuating core having a length equivalent to said upper stem portion, said cylindrical core chamber having sleeving to provide a smooth surface for said actuating core, said coil having a first and second external coil connecting lead, said first external coil connecting lead attaching to a washer control section, said second external coil connecting lead attaching to an off-section of a feature selection switch, said standoff base having a vertical wall structure suitably constructed to contain said actuating core in a de-energized state when coupled to said diverter gate, said cover having an inspection hole for visual observation of said diverter gate in operation.

4. A dump valve for use with automatic clothes washing machines as recited in claim 3, further comprising:
a control circuit coupled to said solenoid for selectively actuating said diverter gate, having an electrical source, a timer switch with rinse cycle portion, and an on/off feature selection switch, said electrical source having a first and second electrical source connection, said first electrical source connection being connected to said first external coil connecting lead, said second electrical source connection being connected to said rinse cycle portion of said timer switch, said rinse cycle portion also having an electrical connection to an on-section of said on/off feature selection switch, said on/off feature switch having said second external coil connecting lead connected to said off-section of said on/off feature switch, said switch when in an off-state will not affect normal draining of said rinse water, said switch when in an on-state and during a selection of said rinse cycle portion will cause said solenoid to be energized and thereby opening said alternate drain outlet and inlet opening within said gate chamber and closing said normal drain outlet and inlet opening within said gate chamber.

* * * * *